United States Patent
Zhu et al.

(10) Patent No.: US 10,240,325 B1
(45) Date of Patent: Mar. 26, 2019

(54) MOUNTING STRUCTURE FOR FAUCET BODY AND SHAFT

(71) Applicants: Xiamen Lota International Co., Ltd., Xiamen, Fujian (CN); Lota Xiamen Industry Co., Ltd., Xiamen, Fujian (CN)

(72) Inventors: Chuanbao Zhu, Xiamen (CN); Yongqiang He, Xiamen (CN); Xianqing Ye, Xiamen (CN)

(73) Assignees: XIAMEN LOTA INTERNATIONAL CO., LTD., Xiamen, Fujian (CN); LOTA XIAMEN INDUSTRY CO., LTD., Xiamen, Fujian (CN)

( * ) Notice: Subject to any disclaimer, the term of this patent is extended or adjusted under 35 U.S.C. 154(b) by 0 days.

(21) Appl. No.: 15/871,108

(22) Filed: Jan. 15, 2018

(30) Foreign Application Priority Data

Sep. 28, 2017 (CN) .......................... 2017 1 0896294

(51) Int. Cl.
*E03C 1/04* (2006.01)
*F16K 27/04* (2006.01)

(52) U.S. Cl.
CPC .............. *E03C 1/04* (2013.01); *F16K 27/041* (2013.01); *Y10T 137/6017* (2015.04); *Y10T 137/9464* (2015.04)

(58) Field of Classification Search
CPC .... E03C 1/0404; E03C 1/0403; E03C 1/0401; E03C 1/04; E03C 2001/0416; Y10T 137/6017; Y10T 137/6014; Y10T 137/9464; F16K 27/041; F16K 19/006
See application file for complete search history.

(56) References Cited

U.S. PATENT DOCUMENTS

| | | | | |
|---|---|---|---|---|
| 5,979,487 A * | 11/1999 | Devehat | .................. | B67D 7/78 137/271 |
| 6,386,226 B1 * | 5/2002 | Lopp | .................. | F16K 11/0787 137/315.13 |
| 6,757,921 B2 * | 7/2004 | Esche | ........................ | E03C 1/04 137/625.4 |
| 8,240,326 B2 * | 8/2012 | Kacik | ........................ | E03C 1/04 137/315.12 |
| 8,453,669 B2 * | 6/2013 | Veros | ........................ | E03C 1/04 137/315.13 |
| 8,863,780 B2 * | 10/2014 | Esche | ................... | E03C 1/0404 137/801 |
| 8,925,572 B2 * | 1/2015 | Shih | ........................ | E03C 1/04 137/315.12 |
| 9,279,238 B2 * | 3/2016 | Flessa | ........................ | E03C 1/04 |

(Continued)

*Primary Examiner* — Craig J Price
*Assistant Examiner* — Andrew J Rost
(74) *Attorney, Agent, or Firm* — Leong C. Lei

(57) ABSTRACT

A mounting structure for a faucet body and a shaft includes a faucet body made of a zinc alloy material, a shaft seat assembly, a shaft and a press cover. The faucet body has a vertical passage and a mounting passage. The shaft seat assembly is disposed separately from the faucet body. The shaft seat assembly includes a shaft seat located in the vertical passage and a sleeve located in the mounting passage. The shaft is inserted in the sleeve and located between the press cover and the shaft seat. The mounting structure can reduce the material cost of the faucet body and ensure the water quality and the strength of the faucet body.

4 Claims, 3 Drawing Sheets

(56) References Cited

U.S. PATENT DOCUMENTS

2011/0297248 A1* 12/2011 Nelson ..................... E03C 1/04
                                                              137/343
2015/0376737 A1* 12/2015 Schroeder ............... F16K 51/00
                                                              420/480

* cited by examiner

MOUNTING STRUCTURE FOR FAUCET BODY AND SHAFT

BACKGROUND OF THE INVENTION

1. Field of the Invention

The present invention relates to a faucet, and more particularly to a mounting structure for a faucet body and a shaft.

2. Description of the Prior Art

A conventional kitchen faucet comprises a faucet body, a water inlet pipe, a secondary water outlet pipe, a shaft, a press cover, a handle, and a water outlet pipe. Wherein, the faucet body is formed with a vertical passage and a shaft mounting passage communicating with the vertical passage. The vertical passage has an upper opening and a lower opening. The shaft mounting passage is integrally formed with a shaft seat. The shaft is mounted in the shaft mounting passage through the press cover and mated with the shaft seat to form a complete waterway control switch. The handle cooperates with the axle of the shaft to control rotation of the shaft. The water inlet pipe and the water outlet pipe are respectively mated with a water inlet and a water outlet of the shaft seat.

Since the shaft seat of the faucet body of the above-mentioned kitchen faucet is in contact with water and the shaft seat is integrally formed with the faucet body, in order to ensure the safety of the water and the strength of the faucet body, the faucet body is generally made of a copper alloy material or a copper material with low lead content. As a result, the material cost of the faucet body is high, which is not beneficial for marketing.

Accordingly, the inventor of the present invention has devoted himself based on his many years of practical experiences to solve these problems.

SUMMARY OF THE INVENTION

The primary object of the present invention is to provide a mounting structure for a faucet body and a shaft, which can lower the material cost of the faucet body.

In order to achieve the aforesaid object, the mounting structure of the present invention comprising a faucet body, a shaft seat assembly mounted in the faucet body, a shaft and a press cover mounted to the shaft seat assembly. The faucet body is made of a zinc alloy material. The faucet body is formed with a vertical passage and a mounting passage communicating with the vertical passage. The vertical passage has an upper opening and a lower opening. An inner end of the mounting passage is communicated with the vertical passage. An outer end of the mounting passage has an opening. An inner wall of the mounting passage is formed with an annular stop rim. The annular stop rim is provided with at least two screw holes extending in an axial direction of the mounting passage for insertion of screws. The shaft seat assembly is disposed separately from the faucet body. The shaft seat assembly includes a shaft seat located in the vertical passage and a sleeve located in the mounting passage. The shaft seat is integrally formed with the sleeve. The shaft seat has a water inlet channel and a water outlet channel to communicate with an inner chamber of the sleeve. An outer wall of the sleeve is formed with an annular flange extending outwardly. The annular flange is in contact with the annular stop rim. The annular flange is provided with through holes corresponding to the screw holes. The screws pass through the through holes of the annular flange and are screwed to the screw holes of the annular stop rim. The press cover has a central hole. The press cover is threadedly connected to the sleeve. The shaft is inserted in the sleeve and located between the press cover and the shaft seat. An axle of the shaft extends out of the central hole of the press cover.

Preferably, the shaft seat assembly is made of a copper material or a copper alloy material.

Preferably, a plastic washer is provided between the annular stop rim and the annular flange, and the plastic washer has guide holes corresponding to the screw holes.

Preferably, the plastic washer is provided with a limit protrusion, and the annular flange is provided with a limit hole to mate with the limit protrusion.

Preferably, the shaft seat assembly is made of a plastic material.

Accordingly, the shaft seat assembly is disposed separately from the faucet body so that the faucet body is not in contact with water, and the faucet body is made of a zinc alloy material with high strength and low price. The present invention can reduce the material cost of the faucet body and ensure the water quality and the strength of the faucet body.

DETAILED DESCRIPTION OF THE PREFERRED EMBODIMENTS

Embodiments of the present invention will now be described, by way of example only, with reference to the accompanying drawings.

Figure 1:
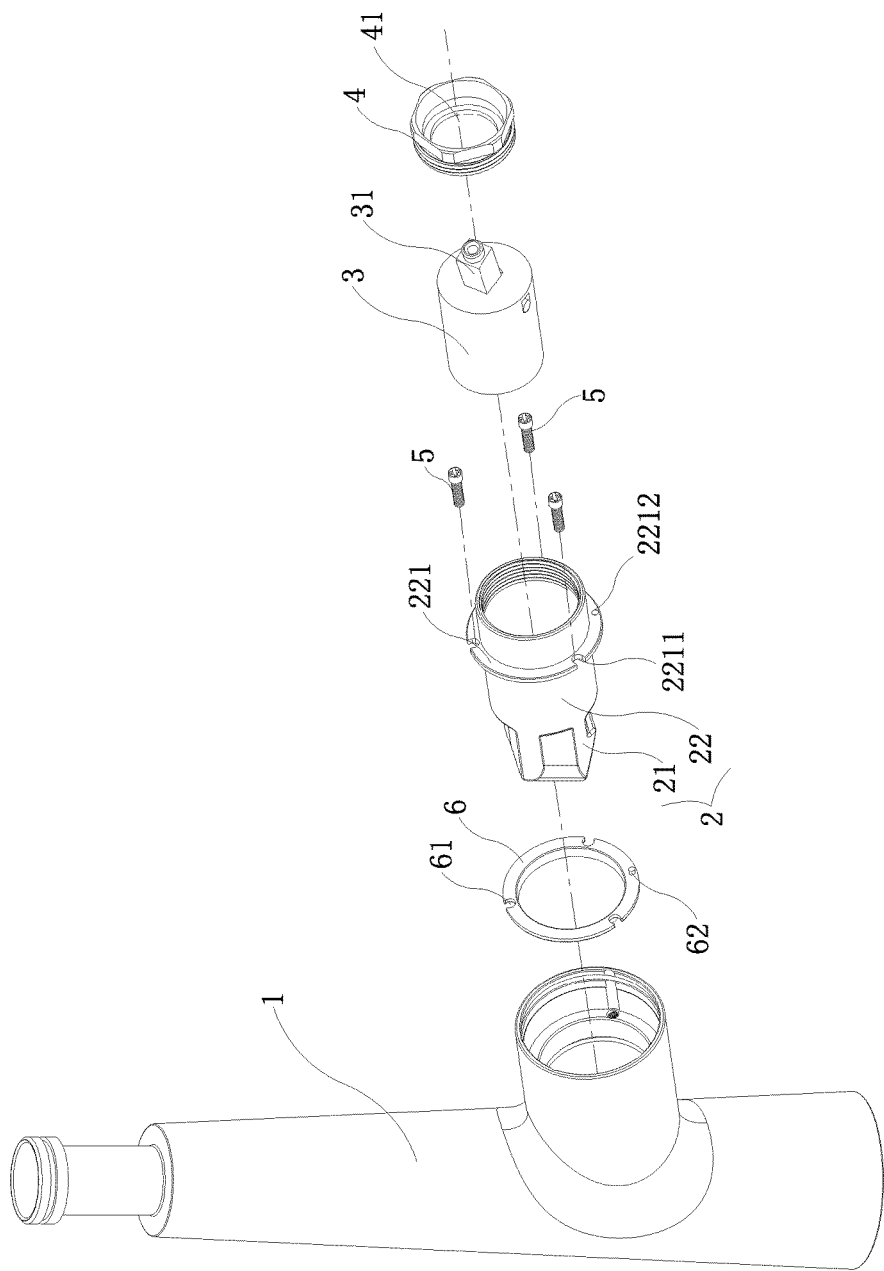
FIG. 1 is an exploded view of the present invention.
Figure 2:
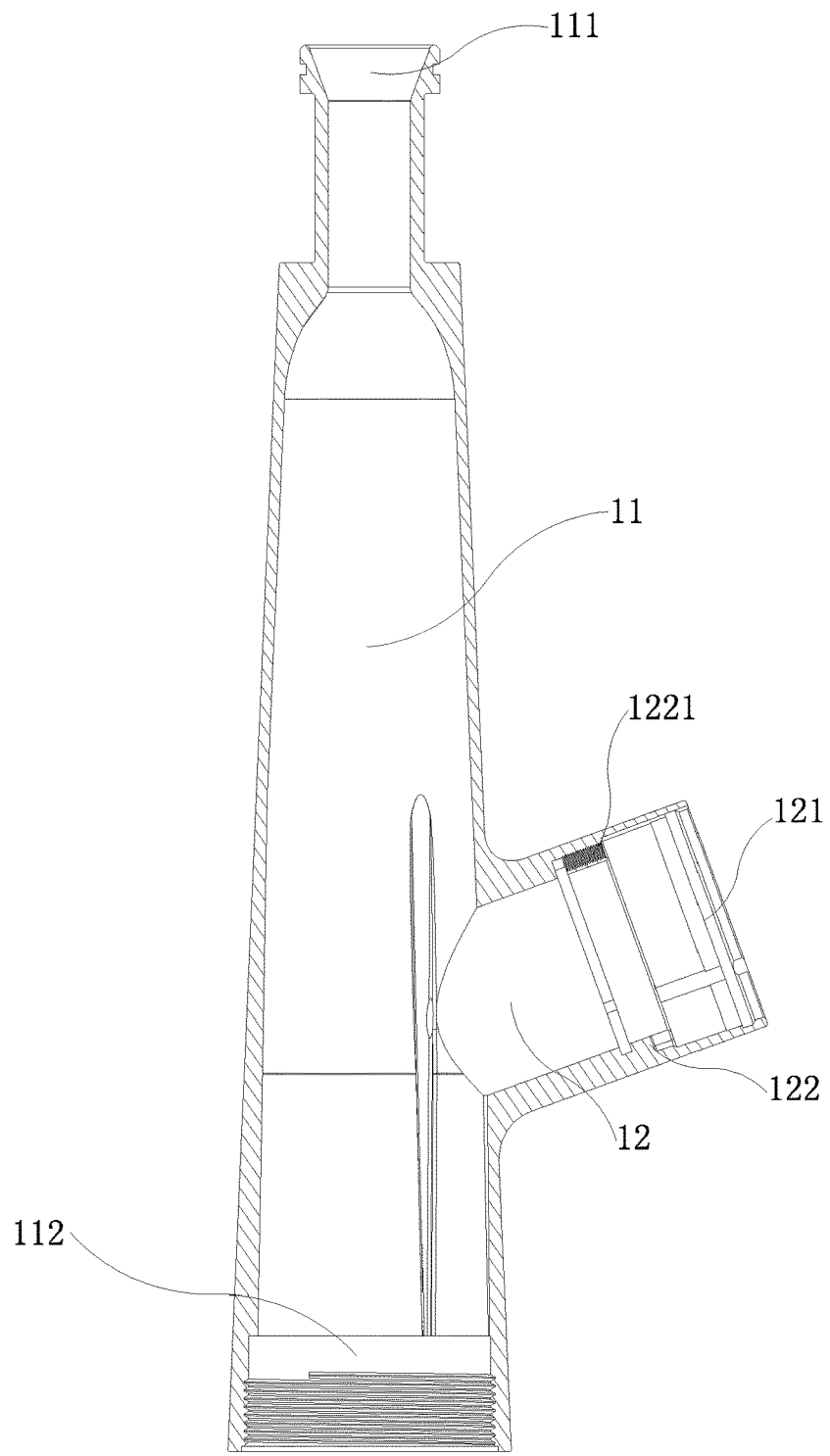
FIG. 2 is a sectional view of the faucet body of the present invention.
Figure 3:
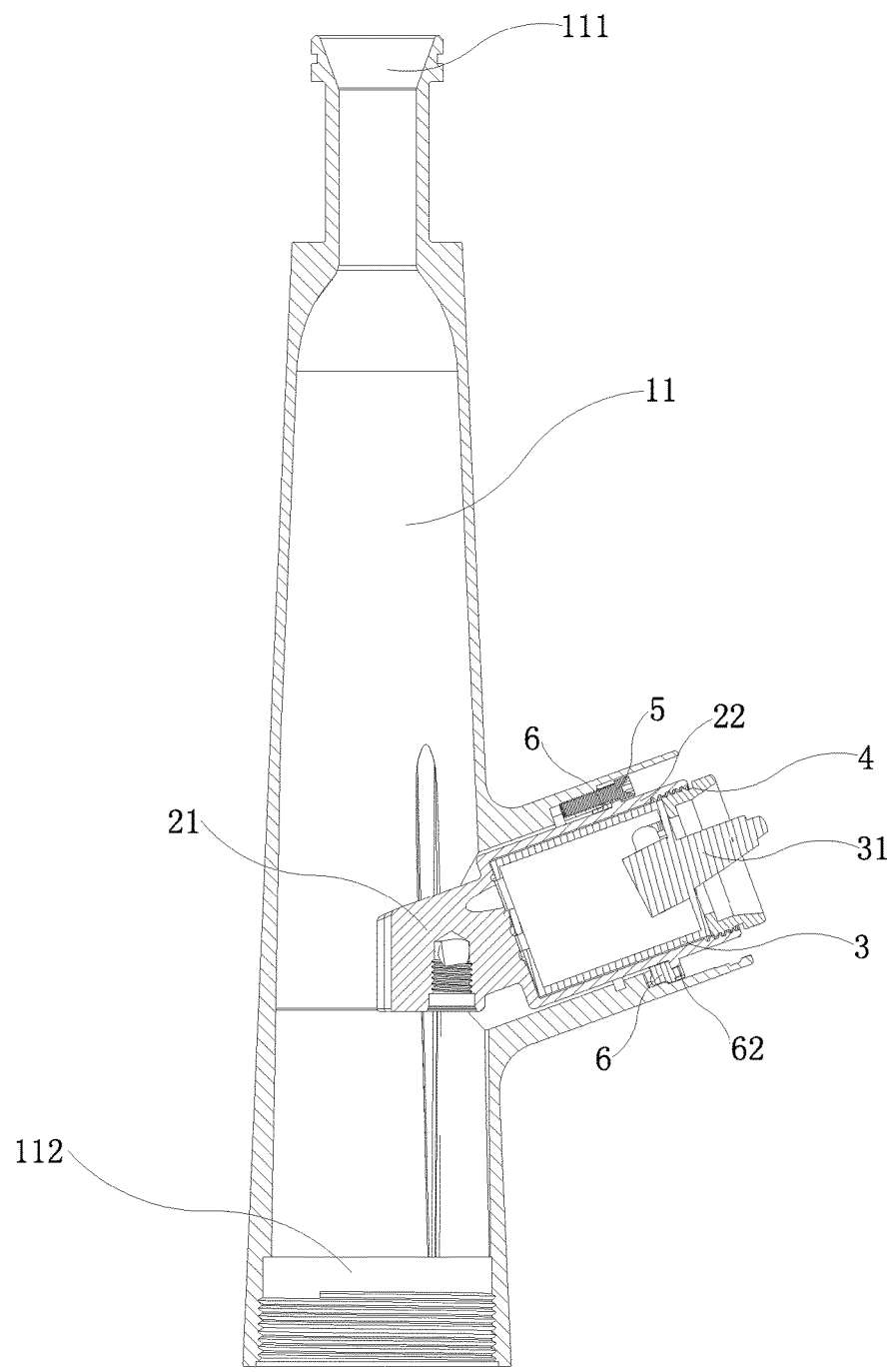
FIG. 3 is a sectional view of the present invention.

As shown in FIG. 1 to FIG. 3, the present invention discloses a mounting structure for a faucet body and a shaft, which comprises a faucet body 1, a shaft seat assembly 2 mounted in the faucet body 1, a shaft 3 and a press cover 4 mounted to the shaft seat assembly 2.

As shown in FIG. 2, the faucet body 1 is made of a zinc alloy material. The faucet body 1 is formed with a vertical passage 11 and a mounting passage 12 communicating with the vertical passage 11. The vertical passage 11 has an upper opening 111 and a lower opening 112. An inner end of the mounting passage 12 is communicated with the vertical passage 11. An outer end of the mounting passage 12 has an opening 121. An inner wall of the mounting passage 12 is formed with an annular stop rim 122. The annular stop rim 122 is provided with at least two screw holes 1221 extending in the axial direction of the mounting passage 12 for insertion of screws 5. The number of the screw holes 1221 may be three. The three screw holes 1221 are equidistantly arranged on the annular stop rim 122.

The shaft seat assembly 2 is disposed separately from the faucet body 1. The shaft seat assembly 2 includes a shaft seat 21 located in the vertical passage 11 of the faucet body 1 and a sleeve 22 located in the mounting passage 12. The shaft seat 21 is integrally formed with the sleeve 22. The shaft seat 21 has a water inlet channel and a water outlet channel to communicate with an inner chamber of the sleeve 22. An outer wall of the sleeve 22 is formed with an annular flange 221 extending outwardly. The annular flange 221 is in contact with the annular stop rim 122. The annular flange 221 is provided with through holes 2211 corresponding to the screw holes 1221. The screws 5 pass through the through holes 2211 of the annular flange 221 and are screwed to the screw holes 1221 of the annular stop rim 122 so that the sleeve 22 is secured in the mounting passage 12 to prevent the sleeve 22 from being rotated and moved. The shaft seat assembly 2 may be made of a copper material or a copper alloy material. Since the material of the faucet body 1 is a zinc alloy material, in order to avoid electrochemical corrosion between the shaft seat assembly 2 and the faucet body 1, a plastic washer 6 is provided between the annular stop rim 122 of the faucet body 1 and the annular flange 221 of the sleeve 22. The plastic washer 6 has guide holes 61 corresponding to the screw holes 1221. The plastic washer 6 can separate the shaft seat assembly 2 from the faucet body 1 so as to prevent electrochemical corrosion between the two. In order to facilitate the guide holes 61 of the plastic washer 6 to align with the screw holes 1221 and the through holes 2211, the annular flange 221 is provided with a limit hole 2212, and the plastic washer 6 is provided with a limit protrusion 62 to mate with the limit hole 2212. The material of the shaft seat assembly 2 is not limited to a copper material or copper alloy material. The shaft seat assembly 2 may be made of a plastic material, which can prevent electrochemical corrosion between the shaft seat assembly 2 and the faucet body 1 and ensure the safety of the water.

The press cover 4 has a central hole 41. The press cover 4 is threadedly connected to the sleeve 22. The screwing engagement between the press cover 4 and the sleeve 22 may be that the peripheral wall of the press cover 4 is provided with external threads and the inner wall of the sleeve 22 is provided with internal threads to mate with the external threads of the press cover 4. The screwing engagement between the press cover 4 and the sleeve 22 may be that the peripheral wall of the press cover 4 is provided with internal threads and the outer wall of the sleeve 22 is provided with external threads to mate with the internal threads of the press cover 4.

The shaft 3 is inserted in the sleeve 22 and located between the press cover 4 and the shaft seat 21. An axle 31 of the shaft 3 extends out of the central hole 41 of the press cover 4 for subsequent engagement with a handle to operate the shaft 3. The specific structure of the shaft 3 is the prior art, and will not be described hereinafter.

To assemble the present invention, the shaft 3 is first inserted in the sleeve 22 of the shaft seat assembly 2, and then the press cover 4 is screwed to the sleeve 22 to limit the shaft 3 in the sleeve 22. The axle 31 of the shaft 3 passes through the central hole 41 of the press cover 4. Then, the plastic washer 6 is fitted onto the annular flange 221. Next, the shaft seat assembly 2 fitted with the shaft 3 and the press cover 4 is placed into the faucet body 1 from the opening 121 of the mounting passage 12, so that the annular flange 221 abuts against the annular stop rim 122. The plastic washer 6 is sandwiched between the annular flange 221 and the annular stop rim 122. The shaft seat 21 of the shaft seat assembly 2 is located in the vertical passage 11. The sleeve 22 is located in the mounting passage 12. Finally, the screws 5 are inserted through the through holes 2211 and the screw holes 1221 to lock the shaft seat assembly 2.

To sum up, the advantages of the present invention are described below. The shaft seat assembly 2 is disposed separately from the faucet body 1 so that the faucet body 1 is not in contact with water; and the faucet body 1 is made of a zinc alloy material with high strength and low price. The present invention can reduce the material cost of the faucet body 1 and ensure the water quality and the strength of the faucet body 1.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A mounting structure for a faucet body and a shaft, comprising the faucet body, a shaft seat assembly mounted in the faucet body, the shaft and a press cover mounted to the shaft seat assembly;

the faucet body being made of a zinc alloy material, the faucet body being formed with a vertical passage and a mounting passage communicating with the vertical passage, the vertical passage having an upper opening and a lower opening; an inner end of the mounting passage being communicated with the vertical passage, an outer end of the mounting passage having an opening; an inner wall of the mounting passage being formed with an annular stop rim, the annular stop rim being provided with at least two screw holes extending in an axial direction of the mounting passage for insertion of screws;

the shaft seat assembly being disposed separately from the faucet body, the shaft seat assembly including a shaft seat located in the vertical passage and a sleeve located in the mounting passage, the shaft seat being integrally formed with the sleeve; the shaft seat having a water inlet channel and a water outlet channel to communicate with an inner chamber of the sleeve, an outer wall of the sleeve being formed with an annular flange extending outwardly, the annular flange being in contact with the annular stop rim, the annular flange being provided with through holes corresponding to the screw holes; the screws passing through the through holes of the annular flange and being screwed to the screw holes of the annular stop rim;

the press cover having a central hole, the press cover being threadedly connected to the sleeve;

the shaft being inserted in the sleeve and located between the press cover and the shaft seat, an axle of the shaft extending out of the central hole of the press cover;

wherein a plastic washer is provided between the annular stop rim and the annular flange, and the plastic washer has guide holes corresponding to the screw holes.

2. The mounting structure of the faucet body and the shaft as claimed in claim 1, wherein the shaft seat assembly is made of a copper material or a copper alloy material.

3. The mounting structure of the faucet body and the shaft as claimed in claim 1, wherein the plastic washer is provided with a limit protrusion, and the annular flange is provided with a limit hole to mate with the limit protrusion.

4. The mounting structure of the faucet body and the shaft as claimed in claim 1, wherein the shaft seat assembly is made of a plastic material.

* * * * *